United States Patent
Mirzaee et al.

(10) Patent No.: US 10,341,045 B2
(45) Date of Patent: Jul. 2, 2019

(54) OUTER LOOP LINK ADAPTATION WITH BUNDLED FEEDBACK

(71) Applicant: Telefonaktiebolaget LM Ericsson (publ), Stockholm (SE)

(72) Inventors: Alireza Mirzaee, Ottawa (CA); Jianguo Long, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 15/552,347

(22) PCT Filed: Mar. 9, 2015

(86) PCT No.: PCT/IB2015/051715
§ 371 (c)(1),
(2) Date: Aug. 21, 2017

(87) PCT Pub. No.: WO2016/142743
PCT Pub. Date: Sep. 15, 2016

(65) Prior Publication Data
US 2018/0026742 A1    Jan. 25, 2018

(51) Int. Cl.
*H04L 1/00* (2006.01)
*H04L 1/18* (2006.01)

(52) U.S. Cl.
CPC .......... *H04L 1/0021* (2013.01); *H04L 1/1822* (2013.01); *H04L 1/0001* (2013.01)

(58) Field of Classification Search
CPC ................................. H04L 1/20–203
See application file for complete search history.

(56) References Cited

U.S. PATENT DOCUMENTS

| 8,432,812 B2 | 4/2013 | Park et al. |
| 8,724,727 B2 | 5/2014 | Oteri et al. |

(Continued)

FOREIGN PATENT DOCUMENTS

| EP | 1505756 A2 | 2/2005 |
| EP | 2228933 A1 | 9/2010 |
| WO | 2015018073 A1 | 2/2015 |

OTHER PUBLICATIONS

Author Unknown, "Technical Specification Group Radio Access Network; Evolved Universal Terrestrial Radio Access (E-UTRA); Physical layer procedures (Release 8)," Technical Specification 36.213, Version 8.7.0, 3GPP Organizational Partners, May 2009, 77 pages.

(Continued)

*Primary Examiner* — Robert C Scheibel
(74) *Attorney, Agent, or Firm* — Withrow & Terranova, PLLC

(57) ABSTRACT

Systems and methods for outer loop Link Adaptation (LA) with bundled feedback are disclosed. In some embodiments, a method of operation of a radio access node in a cellular communications network to provide outer loop LA includes receiving, from a wireless device, a bundled feedback acknowledging reception of data by multiple Hybrid Automatic Repeat Request HARQ) processes at the wireless device. The method also includes, in response to receiving the bundled feedback, updating an outer loop LA parameter based on the number of HARQ processes in the HARQ processes and/or a metric indicative of channel correlation for a channel from the radio access node to the wireless device.

20 Claims, 8 Drawing Sheets

(56) References Cited

U.S. PATENT DOCUMENTS

| | | | |
|---|---|---|---|
| 8,743,783 | B2 | 6/2014 | Han et al. |
| 8,914,686 | B2 | 12/2014 | Mohammadi et al. |
| 8,948,064 | B2 | 2/2015 | Shahar |
| 9,713,189 | B2 | 7/2017 | Lu et al. |
| 2008/0159192 | A1 | 7/2008 | Lee et al. |
| 2009/0141673 | A1 | 6/2009 | Hwang et al. |
| 2010/0284454 | A1* | 11/2010 | Oteri .................. H03M 13/353 375/224 |
| 2013/0095748 | A1 | 4/2013 | Hu et al. |
| 2013/0223318 | A1 | 8/2013 | Liu et al. |
| 2013/0250869 | A1 | 9/2013 | Eriksson |
| 2014/0126467 | A1* | 5/2014 | Lu .......................... H04L 1/003 370/328 |
| 2015/0003425 | A1 | 1/2015 | Kim et al. |
| 2015/0117321 | A1* | 4/2015 | Chen .................... H04L 1/0013 370/329 |
| 2015/0124670 | A1* | 5/2015 | Park ..................... H04L 1/1671 370/281 |

OTHER PUBLICATIONS

Ariyarante, Chamila Asanka, "Link Adaptation Improvements for Long Term Evolution (LTE)", Thesis paper for Blekinge Institute of Technology—Master of Science in Electrical Engineering, Nov. 2009, 73 Pages, Karlskrona, Sweden.

Tepedelenlioğlu, Cihan et al., "Estimation of Doppler spread and signal strength in mobile communications with applications to handoff and adaptive transmission," Wireless Communications and Mobile Computing, vol. 1, Issue 2, Apr./Jun. 2001, John Wiley & Sons, Ltd., pp. 221-242.

Wang, Yuanye, "System Level Analysis of LTE-Advanced: with Emphasis on Multi-Component Carrier Management," PhD Thesis, Sep. 2010, Department of Electronic Systems, the Faculty of Engineering and Science, Aalborg University, Aalborg, Denmark, 195 pages.

International Search Report and Written Opinion for International Patent Application No. PCT/IB2015/051715, dated Nov. 10, 2015, 11 pages.

Non-final Office Action for U.S. Appl. No. 13/671,155, dated Jun. 26, 2014, 53 pages.

Final Office Action for U.S. Appl. No. 13/671,155, dated Oct. 21, 2014, 55 pages.

Advisory Action for U.S. Appl. No. 13/671,155, dated Jan. 27, 2015, 3 pages.

Non-final Office Action for U.S. Appl. No. 13/671,155, dated Jun. 1, 2015, 43 pages.

Non-Final Office Action for U.S. Appl. No. 13/671,155, dated Sep. 17, 2015, 38 pages.

Final Office Action for U.S. Appl. No. 13/671,155, dated Dec. 30, 2015, 38 pages.

Non-Final Office Action for U.S. Appl. No. 13/671,155, dated May 19, 2016, 41 pages.

Final Office Action for U.S. Appl. No. 13/671,155, dated Sep. 16, 2016, 42 pages.

Notice of Allowance for U.S. Appl. No. 13/671,155, dated Mar. 30, 2017, 12 pages.

Invitation to Pay Additional Fees and Partial International Search for PCT/IB2013/059020, dated Apr. 8, 2014, 8 pages.

International Search Report and Written Opinion for PCT/IB2013/059020, dated Jul. 9, 2014, 20 pages.

International Preliminary Report on Patentability for PCT/162013/059020, dated May 21, 2015, 15 pages.

\* cited by examiner

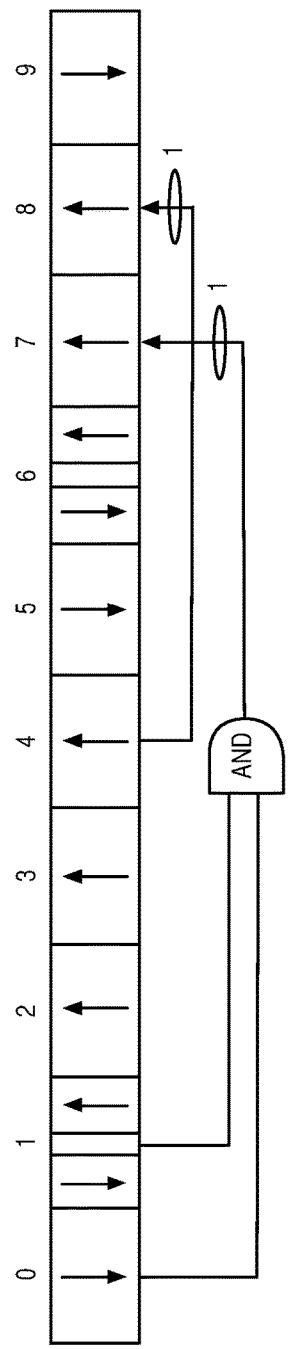
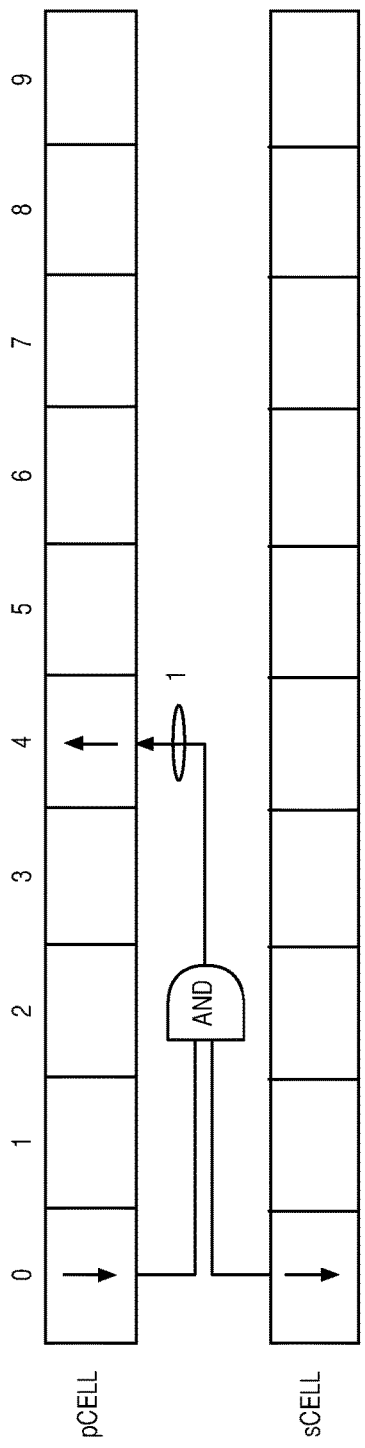
FIG. 1A
(PRIOR ART)
FIG. 1B
(PRIOR ART)

US 10,341,045 B2

OUTER LOOP LINK ADAPTATION WITH BUNDLED FEEDBACK

This application is a 35 U.S.C § 371 national phase filing of International Application No. PTC/IB2015/051715, filed Mar. 9, 2015, the disclosure of which is incorporated herein by reference in its entirety.

TECHNICAL FIELD

The present disclosure relates to outer loop link adaptation (LA) in a cellular communications network.

BACKGROUND $3^{rd}$ Generation Partnership Program (3GPP) Long Term Evolution (LTE) and LTE-Advanced standards are developed to meet growing capacity demands due to rapid expansion of wireless data services. One challenging aspect of these standards is the optimal usage of limited radio resources shared by multiple wireless devices. Specifically, the physical downlink shared channel (PDSCH) is designed to carry downlink data and the physical uplink shared channel (PUSCH) is designed to carry uplink data. In order to determine which Modulation and Coding Scheme (MCS) to use when transmitting to a wireless device using PDSCH, a radio access node estimates a Signal-to-Interference-and-Noise ratio (SINR). A wireless device measures the downlink channel quality and reports this value to the radio access node in terms of a Channel Quality Indicator (CQI) report. A CQI report assumes that if a certain MCS is used, a throughput-optimal target Block Error Rate (BLER), usually defined as 10%, will be achieved in a downlink transmission.

The radio access node translates this CQI to a SINR value. Since there might be some mismatch between the predicted channel quality and the current channel condition, an outer loop adjustment (OLA) is used to adjust the estimated SINR from CQI before being used by the link adaptation:

$$\text{Estimated SINR} = \text{SINR from CQI} + \text{OLA} \quad (1)$$

The OLA is updated based on the received Hybrid Automatic Repeat Request (HARQ) feedback. If a transmission is successful (receiving an Acknowledgement (ACK)) the OLA will be increased by an up-step value, and if the transmission is not successful (receiving a Negative Acknowledgement (NACK)) the OLA will be decreased by a down-step value. With SINR adjusted by OLA, the BLER of the system will converge to a target value determined by the up-step value and the down-step value:

$$\text{target } BLER = \frac{\text{up step}}{\text{up step} + \text{down step}} \quad (2)$$

Equation (2) above defines the fundamental relationship between target BLER, the up-step value and the down-step value. Target BLER is usually a fixed system parameter configured by an operator. For a given BLER target, and assuming that the down-step value is set to a configurable system parameter, the up-step value can be calculated as:

$$\text{up step} = \text{down step} \times \frac{\text{target } BLER}{(1 - \text{target } BLER)} \quad (3)$$

Sometimes a HARQ feedback may contain information for more than one downlink transmission. FIGS. 1A and 1B show two such examples. In Time Division Duplexing (TDD), there are often more downlink subframes than uplink (UL) subframes. Therefore, bundling of HARQ feedbacks is one of two HARQ-ACK feedback schemes defined by 3GPP Technical Specification (TS) 36.213 incorporated herein by reference. With HARQ-ACK feedback bundling, depending on the TDD configuration, several Downlink (DL) HARQ Processes (HPs) are bundled, and only one feedback will be reported on the uplink subframe. This is shown in FIG. 1A where the HARQ feedback for both subframe 0 and subframe 1 are reported in subframe 7. The reported bundled HARQ feedback is ACK if all the HPs in the bundle are ACK, otherwise it will be NACK. For instance, for LTE TDD UL-DL configuration 2 where there are 6 DL subframes, 2 special subframes and 2 UL subframes in a radio frame, there could be a maximum of 4 HPs in the bundle. The number of HPs bundled in a HARQ-ACK feedback depends also on the network traffic, network load, the number of wireless devices in a cell, and the scheduling policy. With bursty traffic (i.e., traffic that is characterized by bursts of high requirements), light traffic load, a larger number of wireless devices in the cell, and proportional, fair scheduling, the likelihood that a wireless device is scheduled in consecutive subframes will decrease. Consequently, the number of HPs bundled in a HARQ-ACK feedback will also decrease.

The bundling of HARQ feedback can also be done in the spatial domain where the HARQ feedbacks for the code words in the same subframe are bundled together. The spatial bundling is performed in HARQ_ACK multiplexing for some configurations of LTE TDD. Also, a wireless device may be configured to receive downlink signals from more than one cell simultaneously, where each cell may use a different carrier frequency to carry a downlink signal. This is called carrier aggregation, in which a cell is also referred to as a carrier. A carrier aggregation capable wireless device may be configured to receive downlink signals from more than one cell but send uplink signals back to one cell only. A cell with which a wireless device initially established a communication and to which the wireless device is sending an uplink signal is called the primary cell (pCell) for the wireless device, while a cell sending an additional downlink signal to the wireless device is called a secondary cell (sCell) for the wireless device. Because of this imbalance between downlink capabilities and uplink capabilities, HARQ feedback may also be bundled in a carrier aggregation mode of operation. This is illustrated in FIG. 1 B, where the wireless device is receiving downlink signals in subframe 0 from a pCell and an sCell but is sending the HARQ feedback for both downlink transmissions in an uplink signal to only the pCell in subframe 4.

With bundled feedback such as HARQ feedback, the target BLER may no longer be throughput optimal. As such, there is a need for outer loop LA with bundled feedback.

SUMMARY

Systems and methods for outer loop Link Adaptation (LA) with bundled feedback are disclosed. In some embodiments, a method of operation of a radio access node in a cellular communications network to provide outer loop LA includes receiving, from a wireless device, a bundled feedback acknowledging reception of data by multiple Hybrid Automatic Repeat Request (HARQ) processes at the wireless device. The method also includes, in response to receiving the bundled feedback, updating an outer loop LA parameter based on the number of HARQ processes in the HARQ processes and/or a metric indicative of channel correlation for a channel from the radio access node to the wireless device.

In some embodiments, updating the outer loop LA parameter includes determining an adjusted target block error rate (BLER) based on a predefined target BLER, the number of HARQ processes in the HARQ processes, and the metric indicative of channel correlation and updating the outer loop LA parameter based on the adjusted target BLER.

In some embodiments, updating the outer loop LA parameter based on the adjusted target BLER includes incrementing the outer loop LA parameter by an up-step value determined based on the adjusted target BLER and a down-step value if the bundled feedback acknowledges successful reception of data by the HARQ processes at the wireless device and decrementing the outer loop LA parameter by the down-step value if the bundled feedback acknowledges unsuccessful reception of data by the HARQ processes.

In some embodiments, updating the outer loop LA parameter based on the adjusted target BLER includes decrementing the outer loop LA parameter by a down-step value determined based on the adjusted target BLER and an up-step value if the bundled feedback acknowledges unsuccessful reception of data by the HARQ processes at the wireless device and incrementing the outer loop LA parameter by the up-step value if the bundled feedback acknowledges successful reception of data by the plurality of HARQ processes.

In some embodiments, determining the adjusted target BLER includes determining the adjusted target BLER based on a decreasing function of the predefined target BLER with respect to the number of HARQ processes in the plurality of HARQ processes for which the bundled feedback is received.

In some embodiments, the decreasing function of the predefined target BLER with respect to the number of HARQ processes in the HARQ processes for which the bundled feedback is received is inversely related to the number of HARQ processes in the HARQ processes for which the bundled feedback is received. In some embodiments, determining the adjusted target BLER includes determining the adjusted target BLER based on a non-decreasing function of the predefined target BLER with respect to the metric indicative of channel correlation.

In some embodiments, the non-decreasing function of the predefined target BLER with respect to the metric indicative of channel correlation is related to one plus a predefined constant times the metric indicative of channel correlation.

In some embodiments, the adjusted target BLER includes determining the adjusted target BLER based on a decreasing function of the predefined target BLER with respect to the number of HARQ processes in the HARQ processes for which the bundled feedback is received and based on a non-decreasing function of the predefined target BLER with respect to the metric indicative of channel correlation.

In some embodiments, determining the adjusted target BLER includes determining the adjusted target BLER based on a product of the decreasing function of the predefined target BLER with respect to the number of HARQ processes in the HARQ processes for which the bundled feedback is received and the non-decreasing function of the predefined target BLER with respect to the metric indicative of channel correlation.

In some embodiments, the bundled feedback is at least one temporal bundling and spatial bundling. In some embodiments, the outer loop LA parameter is a Signal-to-Interference-and-Noise ratio (SINR) parameter, and the method also includes transmitting to the wireless device using a coding scheme that is selected based on the outer loop SINR parameter.

In some embodiments, a bundled feedback acknowledging an unsuccessful reception of data by the HARQ processes at the wireless device indicates an unsuccessful reception of data by at least one of the HARQ processes.

In some embodiments, the metric indicative of channel correlation for the channel from the radio access node to the wireless device is a speed of the wireless device relative to the radio access node, a Doppler spread of the channel, or a coherence time of the channel.

In some embodiments, the radio access node operates in a Time Division Duplex, TDD, mode of operation. In some embodiments, the wireless device is connected to more than one cell of the radio access node in a carrier aggregation mode of operation. In some embodiments, the cellular communications network is a Long Term Evolution, LTE, network.

In some embodiments, a radio access node is adapted to receive, from a wireless device, a bundled feedback acknowledging reception of data by multiple HARQ processes at the wireless device and, in response to receiving the bundled feedback, update an outer loop LA parameter based on the number of HARQ processes in the HARQ processes and a metric indicative of channel correlation for a channel from the radio access node to the wireless device.

In some embodiments, a radio access node in a cellular communications network includes circuitry containing instructions, which when executed, cause the radio access node to receive, from a wireless device, a bundled feedback acknowledging reception of data by multiple HARQ processes at the wireless device and, in response to receiving the bundled feedback, update an outer loop LA parameter based on the number of HARQ processes in the HARQ processes and a metric indicative of channel correlation for a channel from the radio access node to the wireless device.

In some embodiments, a radio access node includes a bundled feedback module operative to receive, from a wireless device, a bundled feedback acknowledging reception of data by multiple HARQ processes at the wireless device and a LA update module operative to, in response to receiving the bundled feedback, update an outer loop LA parameter based on the number of HARQ processes in the HARQ processes and a metric indicative of channel correlation for a channel from the radio access node to the wireless device.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 1A and 1B are diagrams depicting exemplary situations where Hybrid Automatic Repeat Request (HARQ) bundling is used;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 2:
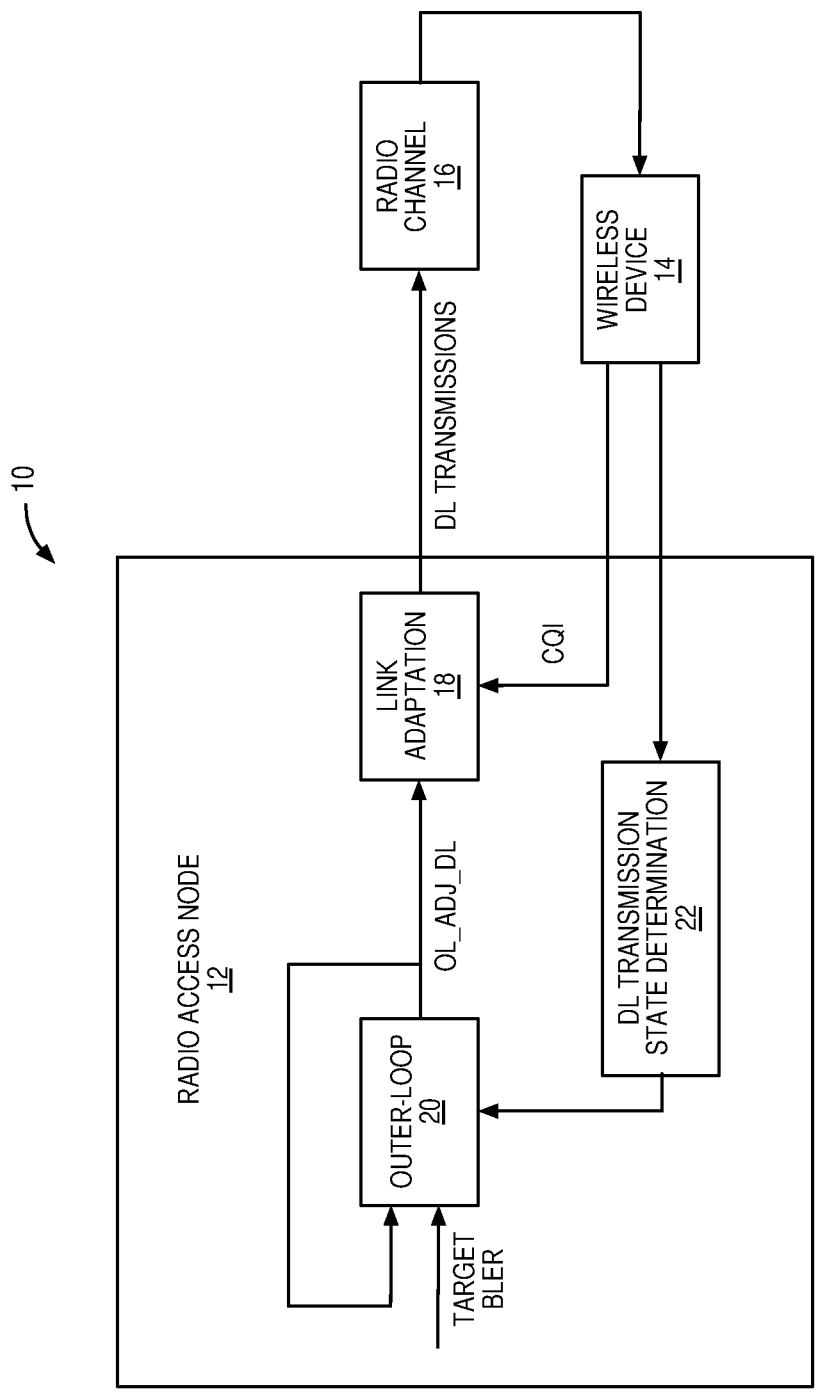
FIG. 2 is a diagram depicting an exemplary radio access node with outer loop Link Adaptation (LA)

Systems and methods are disclosed herein for providing improved outer loop Link Adaptation (LA) with bundled feedback in a cellular communications network. In this regard, FIG. 2 illustrates a cellular communications network 10 including a radio access node 12 that uses improved outer loop Link Adaptation (LA) with Hybrid Automatic Repeat Request (HARQ) feedback according to some embodiments of the present disclosure. As illustrated, the cellular communications network 10 includes the radio access node 12 and a wireless device 14. The radio access node 12 is, in general, any node in a radio access network of the cellular communications network 10. In some embodiments, the radio access node 12 is a base station (e.g., an evolved or enhanced Node B (eNB) in a Long Term Evolution (LTE) network). The wireless device 14 may be any type of wireless device enabled to communicate with the radio access node 12. In LTE, the wireless device 14 may be referred to as a User Equipment device (UE). While only one wireless device 14 is illustrated in FIG. 2, there may be any number of wireless devices 14 served by the radio access node 12.

Notably, much of the discussion herein focuses on embodiments in which the cellular communications network 10 is a 3$^{rd}$ Generation Partnership Project (3GPP) Long Term Evolution (LTE) cellular communications network. As such, 3GPP terminology is oftentimes used herein. However, while the embodiments described herein focus on 3GPP LTE, the embodiments and concepts disclosed herein may be used in any suitable type of existing or future cellular communications network including for example, 3G networks (e.g. UMTS), 4G networks (WiMAX, LTE, LTE-A), 5G or other future networks where feedback bundling is used. Also, much of the discussion herein focuses on embodiments in which the bundled feedback is HARQ feedback, but the same concepts could also apply to other types of bundled feedback which may be used for LA and other types of retransmission processes or mechanisms.

Downlink transmissions from the radio access node 12 to the wireless device 14 are transmitted over a downlink radio channel 16. The downlink radio channel 16 is the medium through which radio signals corresponding to a downlink transmission propagate from the radio access node 12 to the wireless device 14. The downlink radio channel 16 can be characterized in many ways, including by characterizing the relationship between the radio signal transmitted by the radio access node 12 and the radio signal received by the wireless device 14. In some embodiments, if the characteristics of the downlink radio channel 16 are favorable for correctly receiving the transmitted radio signals, the quality of the downlink radio channel 16 is considered good.

The wireless device 14 transmits via an uplink to the radio access node 12. Among other things, the uplink includes a control channel (i.e., a Physical Uplink Control Channel (PUCCH)) that may be used to transmit control information from the wireless device 14 to the radio access node 12. This control information may include at least one of a downlink Channel Quality Indicator (CQI) report and a Hybrid Automatic Repeat Request (HARQ) Acknowledge (ACK) and/or Negative Acknowledge (NACK) feedback. The CQI report is indicative of a channel quality of the downlink radio channel 16. The HARQ ACK/NACK feedback is indicative of whether corresponding downlink transmissions were successfully received by the wireless device 14.

As shown in FIG. 2, the wireless device 14 measures the downlink channel quality and reports this value to the radio access node 12 in terms of a CQI report. A CQI report assumes that if a certain Modulation and Coding Scheme (MCS) is used, a throughput-optimal target Block Error Rate (BLER), usually defined as 10%, will be achieved in a downlink transmission. The radio access node 12 translates this CQI to a Signal-to-Interference-and-Noise ratio (SINR) value in the Link Adaptation (LA) module 18. Since there might be some mismatch between the predicted channel quality and the current channel condition, an outer loop module 20 is used to adjust the estimated SINR from CQI before being used by the LA module 18. In FIG. 2, this is shown by sending an outer loop LA parameter for the downlink (OL_ADJ_DL) to the LA module 18.

The outer loop module 20 updates the outer loop LA parameter based on the received HARQ feedback. If a transmission is successful (receiving an Acknowledgement (ACK)), the outer loop LA parameter will be increased by an up-step value, and if the transmission is not successful (receiving a Negative Acknowledgement (NACK)), the outer loop LA parameter will be decreased by a down-step value. In order to determine whether a transmission is successful, radio access node 12 includes a downlink transmission state determination module 22.

Figure 3:
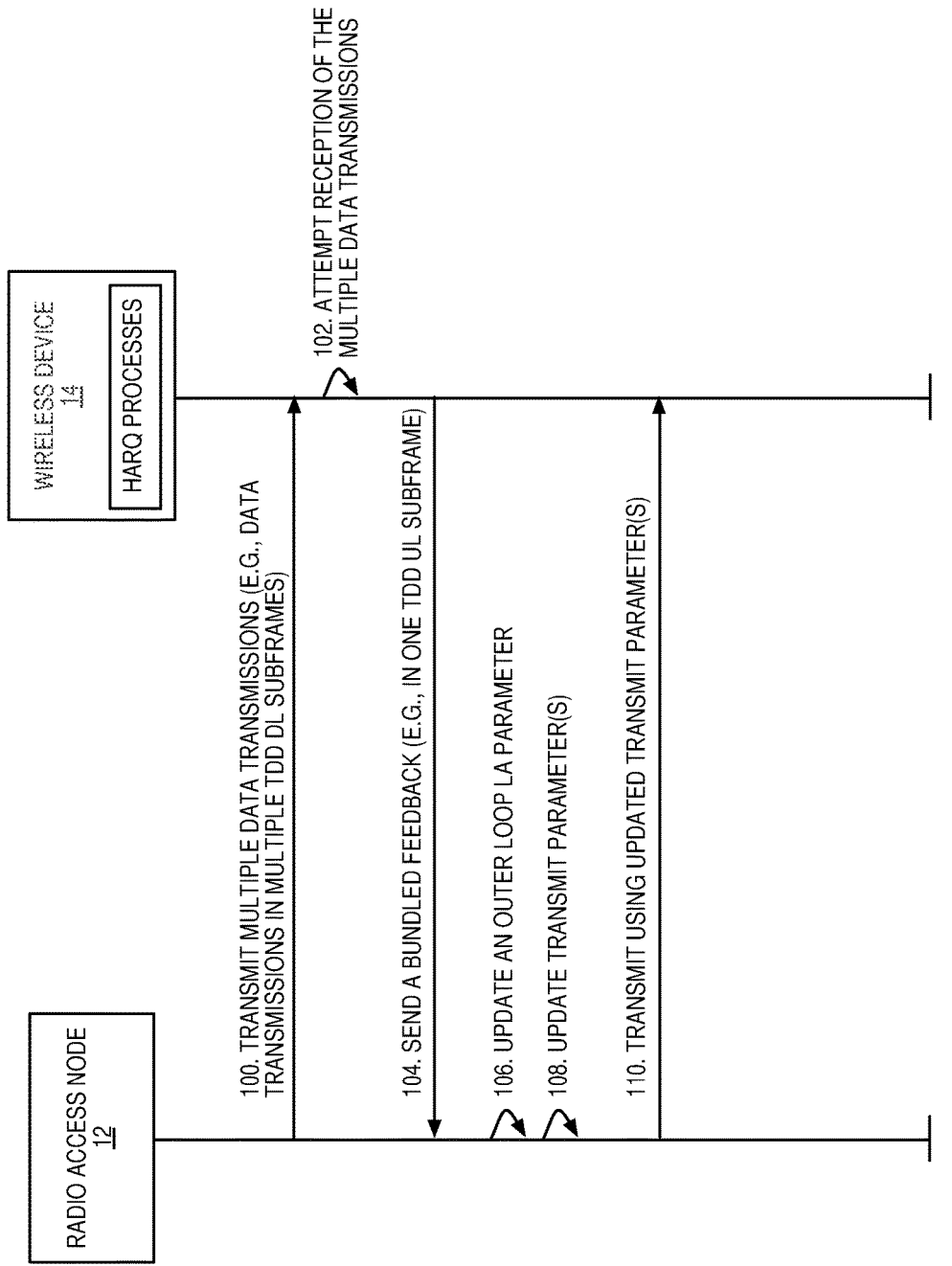
FIG. 3 illustrates a procedure of performing outer loop LA for a wireless device.

FIG. 3 illustrates a potential situation where the radio access node 12 performs outer loop LA for the wireless device 14 according to some embodiments of the present disclosure. In this case, the wireless device 14 includes several HARQ processes. Multiple HARQ processes may be necessary for several reasons. For instance, additional downlink transmissions may be received during the time it takes to determine whether a transmission can be correctly decoded (e.g., 4 ms). In this case, potentially 4 HARQ processes may be running concurrently at different stages of determining whether to send an ACK or a NACK. Also, multiple code words may be included in the same subframe, necessitating additional HARQ processes to determine the transmission status of each. In Time Division Duplexing (TDD), there are often more downlink subframes than uplink subframes. Therefore, multiple HARQ processes may need to be processed until the wireless device 14 can report on an uplink subframe.

Also, the wireless device 14 may be configured to receive downlink signals from more than one cell simultaneously, where each cell may use a different carrier frequency to carry a downlink signal. This is called carrier aggregation, in which each cell is also referred to as a serving cell and has a corresponding carrier referred to as a component carrier. A carrier aggregation capable wireless device 14 may be configured to receive downlink signals from more than one cell but send uplink signals back to one cell only. Because of this imbalance between downlink capabilities and uplink capabilities, multiple HARQ processes may be required.

As shown in FIG. 3, the radio access node 12 transmits multiple data transmissions to the wireless device 14 (step 100). For instance, this may be transmissions in multiple TDD downlink subframes, transmissions in multiple carrier aggregation cells, or some combination of the two. The wireless device 14 then attempts reception of the multiple data transmissions (step 102). The separate transmissions will be monitored by separate HARQ processes in the wireless device 14. In some embodiments, if more than one HARQ process is ready to report HARQ feedback, the wireless device 14 may send a bundled feedback to the radio access node 12 (step 104). In some embodiments, this bundled feedback may be an ACK if all transmissions referred to by the bundled feedback were correctly received, and the bundled feedback will be a NACK if any of the transmissions referred to by the bundled feedback were not correctly received. By transmitting the feedback for multiple HARQ processes in a bundle, significant uplink transmission resources can be saved. However, if only one of the transmissions referred to by the bundled feedback were not correctly received, then the bundled feedback will cause all of the transmissions to be sent again, even though many of them were correctly received.

As discussed above, the radio access node 12 updates an outer loop LA parameter based on the bundled feedback (step 106). The radio access node 12 uses this outer loop LA parameter to update one or more transmit parameters such as the MCS to be used or the transmit power to be used (step 108). The radio access node 12 then transmits the next transmission to the wireless device 14 using the one or more updated transmit parameters (step 110).

Conventionally, when a bundled feedback is received, the outer loop LA parameter is incremented by an up-step value if the bundled feedback is an ACK and decremented by a down-step value if the bundled feedback is a NACK. Conventionally, the up-step value and down-step value used for the bundled feedback are the same as the values used for a non-bundled feedback, and the values are based only on the target BLER. When updating the outer loop LA parameter in the conventional manner, when there is bundled feedback, the target BLER may no longer be throughput optimal. For instance, since each of the bundled feedbacks may refer to a different number (n) of HARQ processes, a single bundled ACK is indicative of n successful receptions, and a single bundled NACK is indicative of at least one unsuccessful reception. When the channel conditions for the multiple transmissions included in the bundled feedback are highly correlated, a bundled NACK is more likely to indicate that more than one (and maybe all) of the transmissions were not successfully received. Conversely, if the channel correlation is low, there is a chance that the bundled NACK was the result of only one (or a few) transmissions not being received. Systems and methods are disclosed herein that take into account the number (n) of HARQ processes for a bundled ACK/NACK and/or a metric indicative of the channel correlation for the multiple transmissions when updating the outer loop LA parameter. In this manner, performance is improved when using HARQ feedback.

Figure 4:
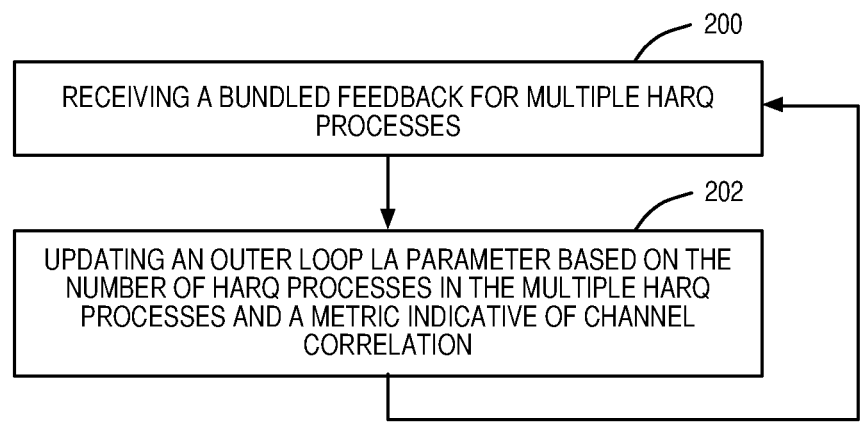
FIG. 4 illustrates the operation of a radio access node for performing outer loop LA with HARQ bundling according to some embodiments of the present disclosure.

In this regard, FIG. 4 illustrates the operation of the radio access node 12 to perform outer loop LA with HARQ bundling according to some embodiments of the present disclosure. The radio access node 12 receives a bundled feedback from the wireless device 14 for multiple HARQ processes operating at the wireless device 14 (step 200). As described above, this bundling may be used in a TDD network or for a carrier aggregation mode of operation. The bundled feedback is indicative of successful/unsuccessful reception of multiple downlink data transmissions (e.g., downlink transmissions in multiple downlink subframes in a TDD network or downlink transmissions from multiple serving cells in a network operating according to a CA scheme).

Figure 5:
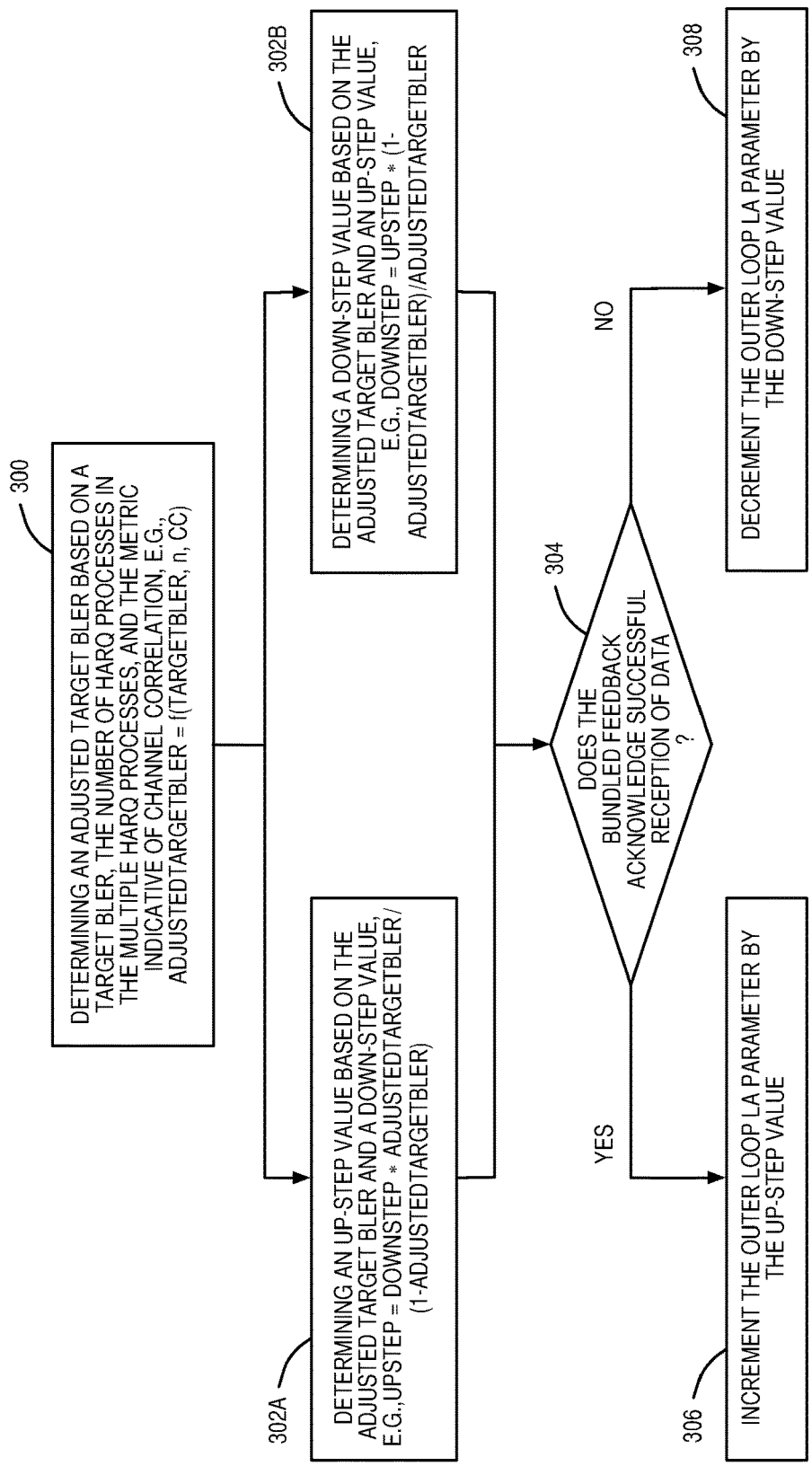
FIG. 5 illustrates the operation of a radio access node for updating an outer loop LA parameter according to some embodiments of the present disclosure.

The radio access node 12 updates the outer loop LA parameter based on the number of HARQ processes in the multiple HARQ processes and/or a metric indicative of channel correlation for the downlink radio channel 16 for the multiple downlink data transmissions (step 202). As discussed below, in some embodiments, the metric is the speed of the wireless device 14 relative to the radio access node 12, the Doppler spread of the channel, or the coherence time of the channel. By taking into account the number of HARQ processes, the update of the outer loop LA parameter will converge more rapidly to a throughput optimal BLER, according to some embodiments. Also, taking the channel correlation into account essentially enables an estimate of whether a bundled NACK is caused by few incorrect receptions or many incorrect receptions. As such, by taking the channel correlation into account, the update of the outer loop LA parameter will converge more rapidly to a throughput optimal BLER, according to some embodiments There are many ways to perform step 202 of FIG. 4. One way to perform this step will now be discussed with respect to FIG. 5. FIG. 5 illustrates the operation of the radio access node 12 to update the outer loop LA parameter according to some embodiments of the present disclosure. First, the radio access node 12 determines an adjusted target BLER based on a target BLER, the number of HARQ processes in the multiple HARQ processes, and the metric indicative of channel correlation (step 300). For example, the relationship between these parameters may be shown as:

$$\text{AdjustedTargetBLER} = f(\text{TargetBLER}, n, CC) \quad (4)$$

In Equation (4), targetBLER is a constant system configured parameter, usually defined as 10%, which is throughput optimal for an additive white Gaussian noise basic noise model for a channel. The number of HARQ processes being reported in the current HARQ feedback bundle is n, and CC is a channel correlation value. Next, the radio access node 12 determines an up-step value based on the adjusted target BLER and a down-step value (step 302A). For example, using the same relationship found in Equation (2), the up-step value can be computed as:

$$\text{upStep} = \text{downStep} * \text{AdjustedTargetBLER}/(1-\text{AdjustedTargetBLER}) \quad (5)$$

Note that the reverse calculation can also be performed. That is, the radio access node 12 could determine a down-step value based on the adjusted target BLER and an up-step value using a reformulation of Equation (5) (step 302B). The radio access node 12 then checks whether the bundled feedback acknowledges successful reception of the data (step 304). If the bundled feedback acknowledges successful reception of the data, the radio access node 12 increments the outer loop LA parameter by the up-step value (step 306). If the bundled feedback does not acknowledge successful reception of the data, the radio access node 12 decrements the outer loop LA parameter by the down-step value (step 308). In some embodiments, this process is repeated for every subframe since the number of HARQ processes in the bundled feedback may change every subframe, and the metric indicative of channel correlation may also change with each subframe.

Figure 6:
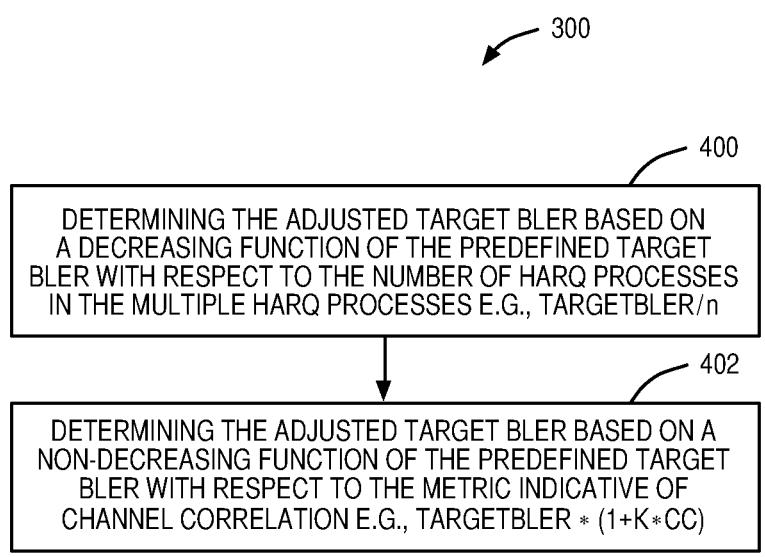
FIG. 6 illustrates the operation of a radio access node for determining an adjusted target Block Error Rate (BLER) according to some embodiments of the present disclosure.

One way of determining the adjusted target BLER in step 300 is shown in FIG. 6 which illustrates the operation of a radio access node 12 for determining an adjusted target BLER according to some embodiments of the present disclosure. For the sake of simplicity, it can be assumed that the target BLER adjustment due to channel correlation and due to the number of HARQ processes bundled in a HARQ feedback are independent from each other, and Equation (6) can be expressed as:

$$\text{AdjustedTargetBLER} = f(\text{TargetBLER}, n, CC) = g(\text{TargetBLER}, n) * m(CC) \quad (6)$$

Also, in some embodiments, one of the two factors may be used without the other. The function g( ) is a decreasing function with respect to n. In some embodiments, g( ) is:

$$g(\text{TargetBLER}, n) = \text{TargetBLER}/n \quad (7)$$

That is, as a larger number of HARQ processes are included in the bundled feedback, the adjusted target BLER decreases.

The function m( ) is a non-decreasing function with respect to CC. In some embodiments, m( ) is:

$$m(CC) = 1 + K*CC \quad (8)$$

In Equation (8), K is a positive constant that can be scaled depending on the specific measure of channel correlation being used or on the relative weight given to the channel correlation adjustment. The metric indicative of the channel correlation, CC, may be the speed of the wireless device 14 in some embodiments. For instance, if the wireless device 14 is stationary or moving slowly, the channel conditions are highly correlated. As the speed of the wireless device 14 increases, the channel conditions become less correlated. In some embodiments, Doppler spread, which is proportional to the speed of the wireless device 14, may also be used. Also, channel coherence time, which is inversely proportional to the speed of the wireless device 14, may be used as a metric indicative of the channel correlation. The speed of the wireless device 14 or equivalently Doppler spread can be estimated in a number of ways summarized in C. Tepedelenlioglu et al., "Estimation of Doppler spread and signal strength in mobile communications with applications to handoff and adaptive transmission", WIRELESS COMMUNICATIONS AND MOBILE COMPUTING *Wireless Communications and Mobile Computing* 2001; 1:221-242, incorporated herein by reference for its teaching on estimating the speed of a wireless device 14.

Again, one way of determining the adjusted target BLER in step 300 is shown in FIG. 6 which illustrates a method of determining the adjusted target BLER where the radio access node 12 determines the adjusted target BLER based on a decreasing function of the predefined target BLER with respect to the number of HARQ processes in the multiple HARQ processes, n (step 400). Then, the radio access node 12 determines the adjusted target BLER based on a non-decreasing function of the predefined target BLER with respect to the metric indicative of channel correlation, CC (step 402). While steps 400 and 402 are shown in a particular order, in some embodiments they be performed in a different order or one of them may be performed separately.

Figure 7:
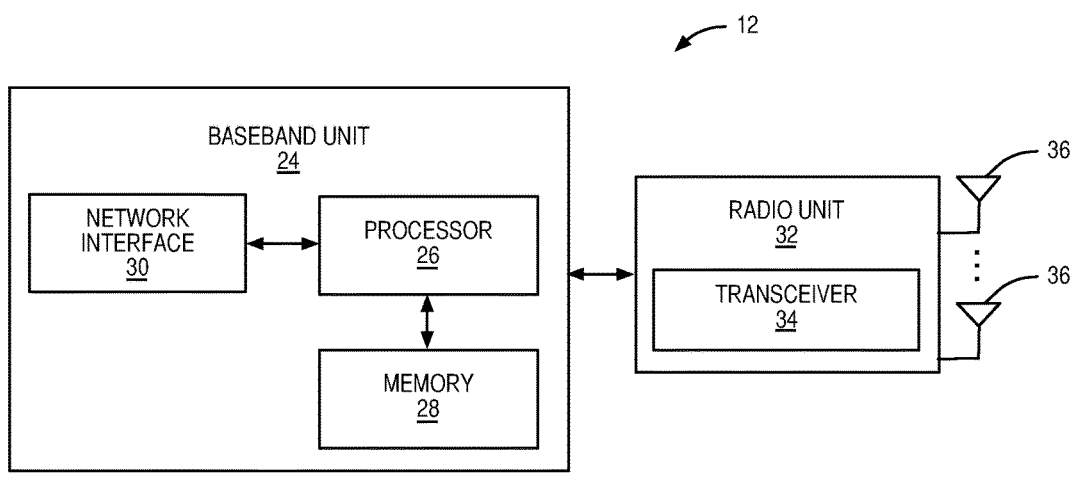
FIG. 7 is a block diagram of a radio access node according to some embodiments of the present disclosure.

FIG. 7 is a block diagram of a radio access node 12 according to some embodiments of the present disclosure. In some embodiments, the radio access node 12 includes circuitry containing instructions, which when executed, cause the radio access node 12 to implement the methods and functionality described here. In one example the circuitry can be in the form of processing means which may include a processor and a memory containing instructions. As illustrated, the radio access node 12 includes a baseband unit 24 with at least one processor 26, memory 28, and a network interface 30. As illustrated, the radio access node 12 also includes a radio unit 32 with a transceiver 34 and one or more antennas 36. In some embodiments, the radio access node 12, or the functionality of the radio access node 12 described with respect to any one of the embodiments described herein, is implemented in software that is stored in, e.g., the memory 28 and executed by the processor 26. The network interface 30 may include one or more components (e.g., network interface card(s)) that connect the radio access node 12 to other systems.

In some embodiments, a computer program including instructions which, when executed by the at least one processor 26, causes the at least one processor 26 to carry out the functionality of the radio access node 12 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 28).

Figure 8:
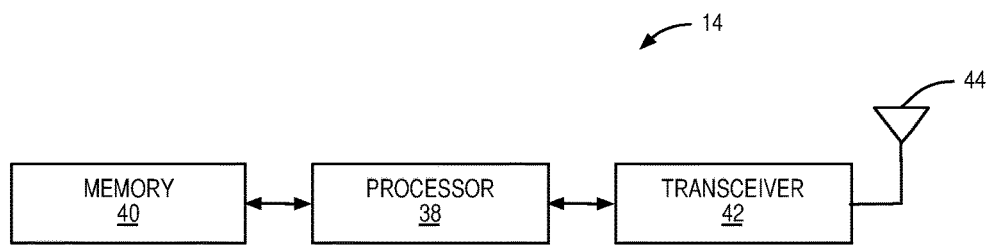
FIG. 8 is a block diagram of a wireless device according to some embodiments of the present disclosure.

FIG. 8 is a block diagram of a wireless device according to some embodiments of the present disclosure. As illustrated, the wireless device 14 includes at least one processor 38, memory 40, a transceiver 42, and at least one antenna 44. In some embodiments, wireless device 14, or the functionality of the wireless device 14 described with respect to any one of the embodiments described herein, is implemented in software that is stored in, e.g., the memory 40 and executed by the processor 38. The transceiver 42 uses the at least one antenna 44 to transmit and receive signals and may include one or more components that connect the wireless device 14 to other systems.

In some embodiments, a computer program including instructions which, when executed by at least one processor 38, causes the at least one processor 38 to carry out the functionality of the wireless device 14 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 40).

Figure 9:
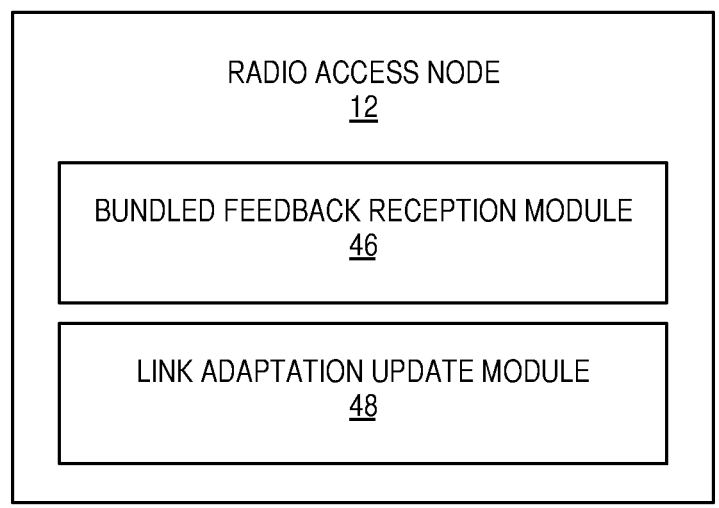
FIG. 9 is a block diagram of a radio access node including a bundled feedback reception module and a link adaptation update module according to some embodiments of the present disclosure.

FIG. 9 is a block diagram of a radio access node 12 including a bundled feedback reception module 46 and a link adaptation update module 48 according to some embodiments of the present disclosure. The bundled feedback reception module 46 and the link adaptation update module 48 are each implemented in software that, when executed by a processor 26 of the radio access node 12, causes the radio access node 12 to operate according to one of the embodiments described herein. The bundled feedback reception module 46 operates to receive, from a wireless device 14, a bundled feedback acknowledging reception of data by a plurality of HARQ processes at the wireless device 14, as described above with respect to the receiving step 200. The link adaptation update module 48 operates to, in response to receiving the bundled feedback, update an outer loop LA parameter based on the number of HARQ processes in the plurality of HARQ processes and/or a metric indicative of channel correlation for a channel from the radio access node 12 to the wireless device 14 as discussed above with respect to, for example, steps 202, 300-308, 400, and 402.

The following acronyms are used throughout this disclosure.

- 3GPP $3^{rd}$ Generation Partnership Project
- 3G $3^{rd}$ Generation
- 4G $4^{th}$ Generation
- 5G $5^{th}$ Generation
- ACK Acknowledgement
- BLER Block Error Rate
- CQI Channel Quality Indicator
- DL Downlink
- eNB Evolved Node B
- HARQ Hybrid Automatic Repeat Request
- HP HARQ Process
- LA Link Adaptation
- LTE Long Term Evolution
- LTE-A Long Term Evolution Advanced
- MCS Modulation and Coding Scheme
- NACK Negative Acknowledgement
- OLA Outer Loop Adjustment
- pCell Primary Cell
- PDSCH Physical Downlink Shared Channel
- PUCCH Physical Uplink Control Channel
- PUSCH Physical Uplink Shared Channel
- sCell Secondary Cell
- SINR Signal-to-Interference-and-Noise Ratio
- TDD Time Division Duplexing
- TS Technical Specification
- UE User Equipment
- UL Uplink
- UMTS Universal Mobile Telecommunications System
- WiMAX Worldwide Interoperability for Microwave Those skilled in the art will recognize improvements and modifications to the embodiments of the present disclosure. All such improvements and modifications are considered within the scope of the concepts disclosed herein and the claims that follow.

What is claimed is:

1. A method of operation of a radio access node in a cellular communications network to provide outer loop link adaptation, LA comprising:
    receiving, from a wireless device, a bundled feedback acknowledging reception of data by a plurality of Hybrid Automatic Repeat Request, HARQ, processes at the wireless device; and
    in response to receiving the bundled feedback, updating an outer loop LA parameter based on the number of HARQ processes in the plurality of HARQ processes and a metric indicative of channel correlation for a channel from the radio access node to the wireless device, where updating the outer loop LA parameter comprises:
        determining an adjusted target block error rate, BLER, based on a predefined target BLER, the number of HARQ processes in the plurality of HARQ processes, and the metric indicative of channel correlation; and
        updating the outer loop LA parameter based on the adjusted target BLER.

2. The method of claim 1 wherein updating the outer loop LA parameter based on the adjusted target BLER comprises:
    incrementing the outer loop LA parameter by an up-step value determined based on the adjusted target BLER and a down-step value if the bundled feedback acknowledges successful reception of data by the plurality of HARQ processes at the wireless device; and
    decrementing the outer loop LA parameter by the down-step value if the bundled feedback acknowledges unsuccessful reception of data by the plurality of HARQ processes.

3. The method of claim 1 wherein updating the outer loop LA parameter based on the adjusted target BLER comprises:
    decrementing the outer loop LA parameter by a down-step value determined based on the adjusted target BLER and an up-step value if the bundled feedback acknowledges unsuccessful reception of data by the plurality of HARQ processes at the wireless device; and
    incrementing the outer loop LA parameter by the up-step value if the bundled feedback acknowledges successful reception of data by the plurality of HARQ processes.

4. The method of claim 1 wherein determining the adjusted target BLER comprises determining the adjusted target BLER based on a decreasing function of the predefined target BLER with respect to the number of HARQ processes in the plurality of HARQ processes for which the bundled feedback is received.

5. The method of claim 4 wherein the decreasing function of the predefined target BLER with respect to the number of HARQ processes in the plurality of HARQ processes for which the bundled feedback is received is inversely related to the number of HARQ processes in the plurality of HARQ processes for which the bundled feedback is received.

6. The method of claim 1 wherein determining the adjusted target BLER comprises determining the adjusted target BLER based on a non-decreasing function of the predefined target BLER with respect to the metric indicative of channel correlation.

7. The method of claim 6 wherein the non-decreasing function of the predefined target BLER with respect to the metric indicative of channel correlation is related to one plus a predefined constant times the metric indicative of channel correlation.

8. The method of claim 1 wherein determining the adjusted target BLER comprises determining the adjusted target BLER based on a decreasing function of the predefined target BLER with respect to the number of HARQ processes in the plurality of HARQ processes for which the bundled feedback is received and based on a non-decreasing function of the predefined target BLER with respect to the metric indicative of channel correlation.

9. The method of claim 8 wherein determining the adjusted target BLER comprises determining the adjusted target BLER based on a product of the decreasing function of the predefined target BLER with respect to the number of HARQ processes in the plurality of HARQ processes for which the bundled feedback is received and the non-decreasing function of the predefined target BLER with respect to the metric indicative of channel correlation.

10. The method of claim 1 wherein the bundled feedback comprises at least one of the group consisting of temporal bundling and spatial bundling.

11. The method of claim 1 wherein the outer loop LA parameter is an outer loop Signal-to-Interference-and-Noise ratio, SINR, parameter and further comprising transmitting to the wireless device using a coding scheme that is selected based on the outer loop SINR parameter.

12. The method of claim 1 wherein a bundled feedback acknowledging an unsuccessful reception of data by the plurality of HARQ processes at the wireless device indicates an unsuccessful reception of data by at least one of the HARQ processes.

13. The method of claim 1 wherein the metric indicative of channel correlation for the channel from the radio access node to the wireless device is one of the group consisting of a speed of the wireless device relative to the radio access node, a Doppler spread of the channel, and a coherence time of the channel.

14. The method of claim 1 wherein the radio access node operates in a Time Division Duplex, TDD, mode of operation.

15. The method of claim 1 wherein the wireless device is connected to more than one cell of the radio access node in a carrier aggregation mode of operation.

16. The method of claim 1 wherein the cellular communications network is a Long Term Evolution, LTE, network.

17. A radio access node in a cellular communications network, comprising:
  circuitry containing instructions, which when executed, cause the radio access node to:
    receive, from a wireless device, a bundled feedback acknowledging reception of data by a plurality of Hybrid Automatic Repeat Request, HARQ, processes at the wireless device; and
    in response to receiving the bundled feedback, update an outer loop link adaptation, LA, parameter based on the number of HARQ processes in the plurality of HARQ processes and a metric indicative of channel correlation for a channel from the radio access node to the wireless device, where updating the outer loop LA parameter comprises:
      determine an adjusted target block error rate, BLER, based on a predefined target BLER, the number of HARQ processes in the plurality of HARQ processes, and the metric indicative of channel correlation; and
      update the outer loop LA parameter based on the adjusted target BLER.

18. The radio access node of claim 17 wherein updating the outer loop LA parameter based on the adjusted target BLER comprises:
  increment the outer loop LA parameter by an up-step value determined based on the adjusted target BLER and a down-step value if the bundled feedback acknowledges successful reception of data by the plurality of HARQ processes at the wireless device; and
  decrement the outer loop LA parameter by the down-step value if the bundled feedback acknowledges unsuccessful reception of data by the plurality of HARQ processes.

19. The radio access node of claim 17 wherein updating the outer loop LA parameter based on the adjusted target BLER comprises:
  decrement the outer loop LA parameter by a down-step value determined based on the adjusted target BLER and an up-step value if the bundled feedback acknowledges unsuccessful reception of data by the plurality of HARQ processes at the wireless device; and
  increment the outer loop LA parameter by the up-step value if the bundled feedback acknowledges successful reception of data by the plurality of HARQ processes.

20. The radio access node of claim 17 wherein determining the adjusted target BLER comprises determine the adjusted target BLER based on a decreasing function of the predefined target BLER with respect to the number of HARQ processes in the plurality of HARQ processes for which the bundled feedback is received.

* * * * *